3,300,523
3 - OXYGENATED 17β-OXY-17α-PREGNEN-20-YN-21 - YLTRI(ALKYL/ARYL)SILANES AND CONGENERIC 3-DESOXY-3,5-DIENES
Edward A. Brown, Wilmette, and Richard A. Mikulec, Chicago, Ill., assignors to G. D. Searle & Co., Chicago, Ill., a corporation of Delaware
No Drawing. Filed Apr. 21, 1965, Ser. No. 449,871
8 Claims. (Cl. 260—397.4)

This invention relates to 3-oxygenated 17β-oxy-17α-pregnen-20-yn-21-yltri(alkyl/aryl)silanes, congeneric 3-desoxy-3,5-dienes, and processes for the preparation thereof. More particularly, this invention provides new, useful, and unobvious chemical compounds of the formulas

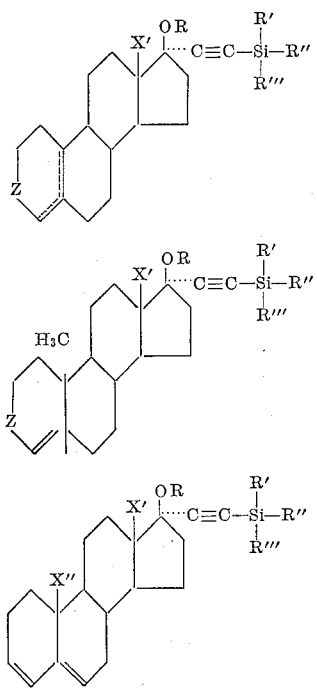

wherein Z represents a carbonyl (OC=), hydroxymethylene (HOCH=), or alkanoyloxymethylene (alkyl-COOCH=) radical; X' represents an alkyl radical; X'' represents hydrogen or a methyl radical; R represents hydrogen or an alkanoyl (alkyl-CO—) radical; and R', R'', and R''' represent alkyl radicals and/or aryl radicals such as phenyl, naphthyl, etc. the same or different, and the dotted line indicates a double bond in the 4(5) or 5(10) position. Among the alkyl radicals comprehended by the foregoing formulas, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings of the formula —$C_nH_{2n+1}$ wherein $n$ represents a positive integer less than 8.

The compounds to which this invention relates are useful by reason of their valuable pharmacological properties. Thus, for example, they are estrogenic, progestational, and hypocholesterolemic; they counteract the development of exogenously-induced hypercholesterolemia; and they inhibit pepsin proteolysis.

Preparation of the compounds to which this invention relates proceeds variously as follows: A 17α-pregn-4-en-20-yn-3,17β-diol of the formula

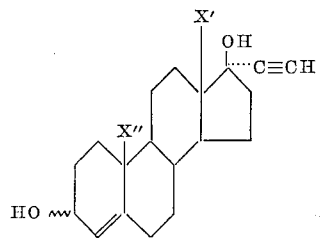

wherein X' and X'' are defined as before, is consecutively heated, in tetrahydrofuran, with an alkyl magnesium bromide and a chlorosilane of the formula

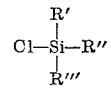

wherein R', R'', and R''' are defined as before. Hydrolysis of the product with aqueous acid affords the corresponding diol of the invention

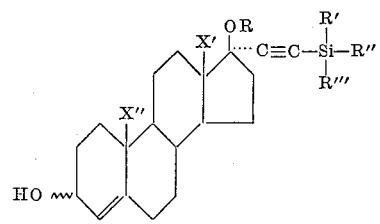

wherein X', X'', R', R'', and R''' retain the meanings previously assigned. The diol is converted to the corresponding 3-oxo-17-ol of the invention by prolonged contact in 2-propanol with manganese dioxide. Alternatively, 19-nor-3-oxo-17-ols of the invention are obtained from enol ethers of the formula

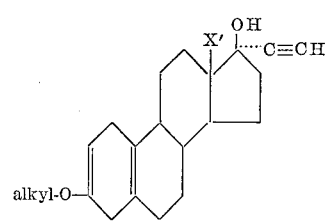

(X' being defined as before) by treatment with an alkyl-magnesium bromide and a chlorosilane as set forth above, followed by hydroylsis with aqueous mineral acid. Substitution of methanolic oxalic acid for the mineral acid affords the corresponding 5(10) isomers. (See Example 4 hereinafter for details.) The alcohols of the invention are heated with pyridine and an alkanoic acid anhydride or chloride to give the corresponding esters hereof, one or both hydroxyls, if present, being esterified, depending on the relative concentration of the esterifying agent and the reaction time. (Cf. Examples 2 and 3.) Finally, the 3-desoxy-3,5-dienes of the invention are prepared by heating a diol of the formula

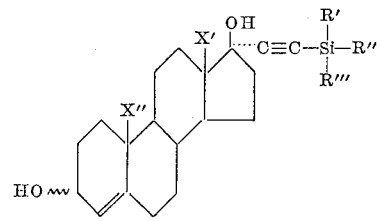

in aqueous alcoholic sulfuric acid. (Illustrated by Example 7.)

The following examples describe in detail compounds representative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

3β,17β-dihydroxy-19-nor-17α-pregn - 4 - en - 20-yn-21-yltrimethylsilane.—To a stirred solution of approximately 14 parts of methylmagnesium bromide in 90 parts of tetrahydrofuran at the boiling point under reflux is added, during 2 hours, a solution of 3 parts of 19-nor-17α-pregn-4-en-20-yne-3β,17β-diol in 45 parts of tetrahydrofuran. Stirring and boiling under reflux are continued for a total of 45 hours, a solution of approximately 10 parts of chlorotrimethylsilane in 45 parts of tetrahydrofuran being introduced during 1 hour at the end of the first 28 hours. The resultant mixture is allowed to cool to room temperature and then poured into approximately 125 parts of ice-cold aqueous 10% acetic acid. The mixture thus obtained is extracted with ether; and the ether extracts are successively washed with water, aqueous 10% potassium bicarbonate, water, and saturated brine, then dried over anhydrous sodium sulfate. Solvent is removed by distillation and the residue chromatographed on alumina, using benzene and ethyl acetate as developing solvents. From an eluate comprising 10% ethyl acetate in benzene, on evaporation of solvent, recrystallization of the residue from a mixture of ethyl acetate and hexane, and vacuum drying of the product, is obtained 3β,17β-dihydroxy-19-nor-17α-pregn-4-en-20-yn-21-yltrimethylsilane melting at approximately 149–150.5° and having the formula

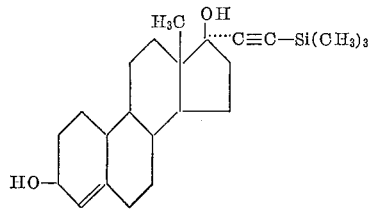

*Example 2*

3β-acetoxy - 17β-hydroxy-19-nor-17α-pregn-4-en-20-yn-21-yltrimethylsilane.—A solution of 37 parts of 3β,17β-dihydroxy-19-nor-17α-pregn - 4 - en-20-yn-21-yltrimethylsilane in 1000 parts of pyridine and 15 parts of acetic anhydride is warmed at 90–95° for 4 hours. The solution is then cooled and thereupon poured into 2500 parts of water. The oil which separates is taken up in benzene; and the benzene solution is washed with water, dried over anhydrous sodium sulfate, and stripped of solvent by vacuum distillation. The residue is crystallized from heptane to give 3β-acetoxy-17β-hydroxy - 19 - nor - 17α-pregn-4-en-20-yn-21-yltrimethylsilane as a hemisolvate melting at 76–79°, the solvent of crystallization being driven off in process. The product has the formula

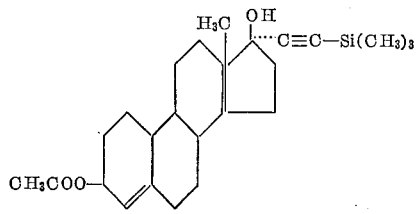

*Example 3*

3β,17β-diacetoxy-19-nor - 17α - pregn-4-en-20-yn-21-yltrimethylsilane.—A solution of 37 parts of 3β,17β-dihydroxy-19-nor-17α-pregn-4-en-20-yn-21 - yltrimethylsilane in 500 parts of pyridine and 250 parts of acetic anhydride is heated at 90–95° for 24 hours. The resultant solution is cooled and thereupon poured into approximately 3 volumes of water. The insoluble gum which forms is taken up in benzene; and the benzene solution is washed with water, dried over anhydrous sodium sulfate, and stripped of solvent by vacuum distillation. The residue is crystallized from pentane to give 3β,17β-diacetoxy-19-nor-17α-pregn-4-en-20-yn-21-yltrimethylsilane melting at 87–90°. The product has the formula

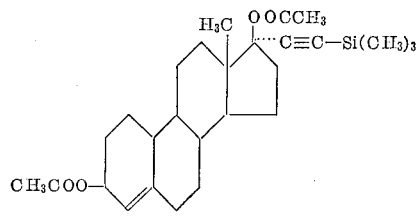

*Example 4*

17β - hydroxy - 3 - oxo-19-nor-17α-pregn-5(10)-en-20-yn-21-yltrimethylsilane.—To approximately 5 parts of ethylmagnesium bromide in approximately 10 parts of ether is slowly added, with stirring, 15 parts of tetrahydrofuran. Solvent is distilled until the temperature of the distilland reaches 58°, at which point a solution of 3 parts of 3-methoxy-19-nor - 17α - pregna - 2,5(10)-dien-20-yn-17β-ol in 40 parts of tetrahydrofuran is stirred in and the resultant mixture heated at the boiling point under reflux with continued stirring for 21 hours, a further 2 parts of ethylmagnesium bromide in 4 parts of ether being introduced at the end of the first 18 hours. The mixture thus obtained is cooled to room temperature, whereupon a solution of approximately 3 parts of chlorotrimethylsilane in 10 parts of tetrahydrofuran is added and heating at the boiling point under reflux is resumed for a total of 5 hours, there being consecutively incorporated 2 parts of water and a solution of 9 parts of oxalic acid in 90 parts of methanol 10 minutes before the end of this heating period. The resultant mixture is stirred into 3 volumes of water; and the supernatant layer is separated, dried over anhydrous sodium sulfate, and freed of solvent by vacuum distillation. The residue is 17β - hydroxy - 3 - oxo - 19 - nor - 17α - pregn-5(10)-en-20-yn-21-yltrimethylsilane, having the formula

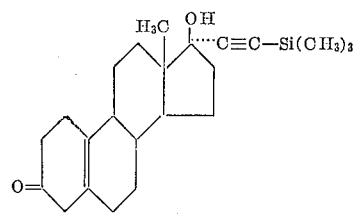

*Example 5*

17β - hydroxy - 3 - oxo - 19 - nor - 17α-pregn-4-en-20-yn-21-yltrimethylsilane.—To a stirred solution of 3 parts of 17β - hydroxy - 3 - oxo - 19 - nor-17α-pregn-5(10)-en-20-yn-21-yltrimethylsilane in 60 parts of tetrahydrofuran is added 2 parts of hydrochloric acid and 7 parts of water. Stirring is continued for 10 minutes, whereupon the supernatant layer is separated, diluted with 35 parts of ether, washed well with water, dried over anhydrous sodium sulfate, and freed of solvent by vacuum distillation. The residue, crystallized in hexane and recrystallized from ethyl acetate, melts at 145–148°. The product has the formula

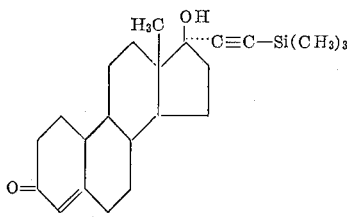

Example 6

*17β - hydroxy - 3 - oxo - 19 - nor-17α-pregn-4-en-20-yn-21-yltrimethylsilane.*—A solution of 37 parts of 3β,17β-dihydroxy - 19 - nor - 17α - pregn - 4 - en-20-yn-21-yltrimethylsilane in 2000 parts of 2-propanol is stirred at ambient temperatures with 180 parts of activated manganese dioxide for 3 days. The resultant mixture is filtered through diatomaceous earth, and the filtrate is stripped of solvent by vacuum distillation. The residue, crystallized from 10% ethyl acetate in hexane, affords 17β - hydroxy - 3 - oxo - 19 - nor - 17α - pregn-4-en-20-yn-21-yltrimethylsilane which, being polymorphic, melts either at 126.5–128° or at 145.5–148°. The higher melting material is obtainable from the lower melting by sublimation and is identical with the product of Example 5.

Example 7

*17β -hydroxy - 19 - nor - 17α-pregna-3,5-dien-20-yn-21-yltrimethylsilane.*—A suspension of 37 parts of 3β,17β-dihydroxy - 19 - nor - 17α - pregn-4-en-20-yn-21-yltrimethylsilane in a mixture of 1600 parts of ethanol, 1000 parts of water, and 920 parts of concentrated sulfuric acid is heated at the boiling point under reflux for 1 hour, then poured onto ice. The resultant mixture is extracted with ether. The ether extract is consecutively washed with aqueous potassium bicarbonate and water, dried over anhydrous sodium sulfate, and stripped of solvent by vacuum distillation. The residue is chromatographed on alumina, using benzene as developing solvent. From the eluate, on evaporation of solvent and crystallization of the residue from aqueous acetone, 17β-hydroxy - 19 - nor - 17α - pregna-3,5-dien-20-yn-21-yltrimethylsilane is obtained as a hemisolvate melting at 101–106°, the solvent of crystallization being given off in process. The product has the formula

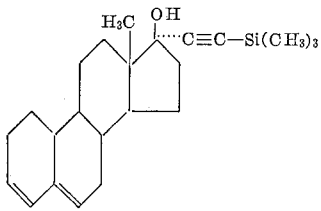

Example 8

*3β,17β-dihydroxy-17α-pregn-4-en-20-yn-21 - yltrimethylsilane.*—To a stirred solution of approximately 14 parts of methylmagnesium bromide in 90 parts of tetrahydrofuran at the boiling point under reflux is added, during 2 hours, a solution of approximately 3 parts of 17α-pregn-4-en-yne-3β,17β-diol in 45 parts of tetrahydrofuran. Stirring and boiling under reflux is continued for a total of 45 hours, a solution of approximately 10 parts of chlorotrimethylsilane in 45 parts of tetrahydrofuran being introduced during 1 hour at the end of the first 28 hours. The resultant mixture is allowed to cool to room temperature and then poured into approximately 125 parts of ice-cold aqueous 10% acetic acid. The mixture thus obtained is extracted with ether; and the ether extract is successively washed with water, aqueous 10% potassium bicarbonate, water, and saturated brine, then dried over anhydrous sodium sulfate. Solvent is removed by distillation and the residue chromatographed on alumina, using benzene and ethyl acetate as developing solvents. From an eluate comprising 20% ethyl acetate in benzene, on evaporation of solvent, recrystallization of the residue from a mixture of ethyl acetate and hexane, and vacuum drying of the product at 100°, is obtained 3β,17β-dihydroxy-17α-pregn-4-en-20-yn-21 - yltrimethylsilane melting at 185–188°. The product has the formula

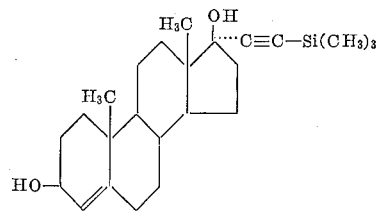

Example 9

*3β,17β-dihydroxy-19-nor-17α-pregn-4-en - 20 - yn - 21-yltriethylsilane.*—Substitution of 12 parts of chlorotriethylsilane for the chlorotrimethylsilane called for in Example 1 affords, by the procedure there detailed, 3β,17β-dihydroxy-19-nor-17α-pregn-4-en-20-yn-21 - yltriethylsilane melting at approximately 149–150°. The product has the formula

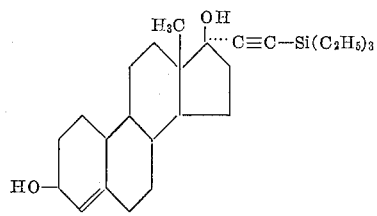

Example 10

*3β,17β-dihydroxy-19-nor-17α-pregn-4-en - 20 - yn - 21-yltripropylsilane.*—Substitution of approximately 17 parts of chlorotripropylsilane for the chlorotrimethylsilane called for in Example 1 affords, by the procedure there detailed. 3β,17β-dihydroxy-19-nor-17α-pregn-4-en-20-yn-21-yltripropylsilane melting at 51–53° The product has the formula

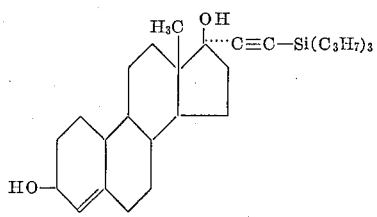

Example 11

*3β,17β-dihydroxy-19-nor-17α-pregn-4-en - 20 - yn - 21-ylethyldimethylsilane.*—Substitution of approximately 11 parts of chloroethyldimethylsilane and approximately 3 parts of 19-nor-17α-pregn-4-en-20-yne-3β,17β-diol for the chlorotrimethylsilane and 17α-pregn-4-en-20-yne - 3β,17β-diol, respectively, called for in Example 8 affords, by the procedure there detailed, 3β,17β-dihydroxy-19 - nor - 17α-pregn-4-en-20 - yne - 21 - ylethyldimethylsilane melting at 161.5–163.5°. The product has the formula

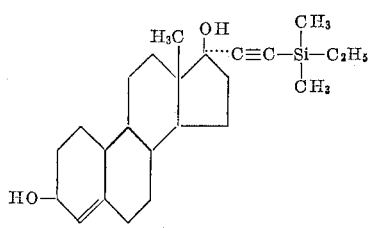

Example 12

*3β,17β-dihydroxy-19-nor-17α-pregn-4-en - 20 - yn - 21-ylethymethylpropylsilane.*—Substitution of approximately 14 parts of chloroethylmethylpropylsilane and approximately 3 parts of 19-nor-17α-pregn-4-en-20-yne-3β,17β-diol for the chlorotrimethylsilane and 17α-pregn-4-en-20-yne-3β,17β-diol, respectively, called for in Example 8 affords, by the procedure there detailed, 3β,17β-dihydroxy-19-nor-17α-pregn-4-en-20-yne - 21 - ylethylmethylpropylsilane melting at 135–137°. The product has the formula

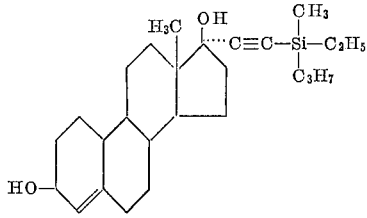

Example 13

*3β,17β-dihydroxy-19-nor-17α-pregn-4 - en - 20 - yn - 21-yltriphenylsilane.*—To a stirred solution of approximately 14 parts of methylmagnesium bromide in 90 parts of tetrahydrofuran at the boiling point under reflux is added, during 2 hours, a solution of 3 parts of 19-nor-17α-pregn-4-en-20-yne-3β,17β-diol in 45 parts of tetrahydrofuran. Stirring and boiling under reflux is continued for a total of 45 hours, a solution of approximately 27 parts of chlorotriphenylsilane in 45 parts of tetrahydrofuran being introduced during 1 hour at the end of the first 28 hours. The resultant mixture is allowed to cool to room temperature and then poured into approximately 125 parts of ice-cold aqueous 10% acetic acid. The mixture thus obtained is extracted with ether; and the ether extracts are successively washed with water, aqueous 10% potassium bicarbonate, water, and saturated brine, then dried over anhydrous sodium sulfate. Solvent is removed by distillation and the residue chromatographed on alumina, using benzene and ethyl acetate as developing solvents. From an eluate comprising 35% ethyl acetate in benzene, on evaporation of solvent and recrystallization of the residue from 15% ethyl acetate in hexane, followed by vacuum drying of the product at 75°, is obtained 3β,17β-dihydroxy-19-nor-17α-pregn-4-en-20-yn-21 - yltriphenylsilane melting at 97.5–100°. The product has the formula

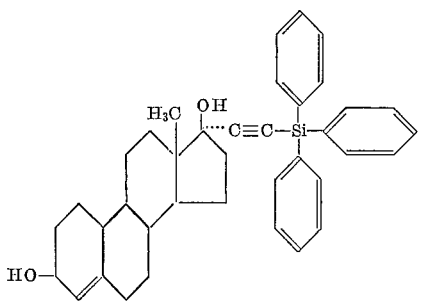

What is claimed is:

1. A compound selected from the group consisting of compounds of the formulas

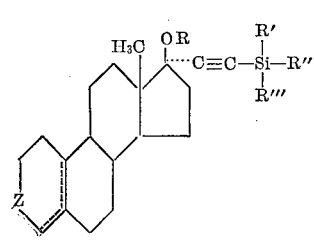

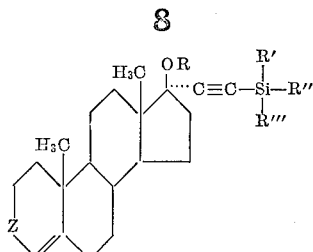

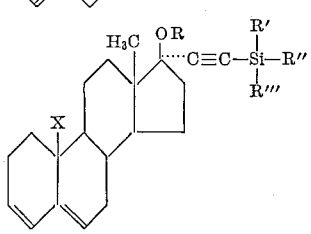

wherein Z represents a member of the group consisting of

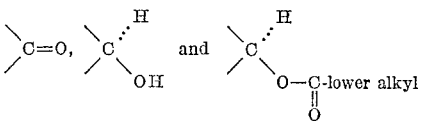

R represents a member of the group consisting of

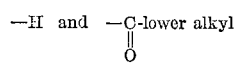

R', R", and R''' represent a member of the group consisting of

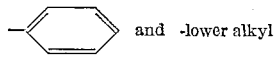

X represents a member of the group consisting of

—H and —CH₃ and the dotted line designates a double bond in a position selected from the group consisting of 4(5) and 5(10).

2. A compound of the formula

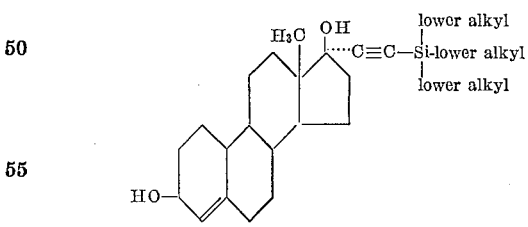

3. 3β,17β-dihydroxy-19-nor-17α-pregn - 4 - en - 20 - yn-21-yltrimethylsilane.

4. 17β-hydroxy-3-oxo-19-nor-17α-pregn-5(10) - en - 20-yn-21-yltrimethylsilane.

5. 17β-hydroxy-3-oxo-19-nor-17α-pregn-4-en - 20 - yn-21-yltrimethylsilane.

6. 17β-hydroxy-19-nor-17α-pregna - 3,5 - dien - 20 - yn-21-yltrimethylsilane.

7. 3β,17β-dihydroxy-17α-pregn-4-en - 20 - yn - 21-yltrimethylsilane.

8. 3β,17β-dihydroxy-19-nor-17α-pregn - 4 - en 20 - yn-21-yltriphenylsilane.

No references cited.

LEWIS GOTTS, *Primary Examiner.*

HENRY A. FRENCH, *Assistant Examiner.*